United States Patent
Yang

(10) Patent No.: US 7,661,686 B2
(45) Date of Patent: Feb. 16, 2010

(54) STEERING STRUCTURE OF A WALK-SUBSTITUTING CART

(75) Inventor: Hui-Pin Yang, Chia Yi (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 688 days.

(21) Appl. No.: 11/523,521

(22) Filed: Sep. 20, 2006

(65) Prior Publication Data

US 2008/0067768 A1   Mar. 20, 2008

(51) Int. Cl.
*B62D 7/16* (2006.01)
(52) U.S. Cl. .................. 280/93.503; 280/779; 280/771; 74/494
(58) Field of Classification Search ............ 280/771, 280/774, 778, 779, 89.11, 93.502, 93.503, 280/93.51, 93.513; 180/78; 74/494
See application file for complete search history.

(56) References Cited

U.S. PATENT DOCUMENTS

| | | | | |
|---|---|---|---|---|
| 1,274,978 A | * | 8/1918 | Bishop | ................. 74/494 |
| 2,406,261 A | * | 8/1946 | Sprinkel | ................. 180/322 |
| 2,707,109 A | * | 4/1955 | Umstott | ................. 280/774 |
| 5,722,504 A | * | 3/1998 | Gaetani | ................. 180/411 |
| 6,921,109 B2 | * | 7/2005 | Hutchison et al. | ........... 280/771 |

* cited by examiner

*Primary Examiner*—Ruth Ilan
(74) *Attorney, Agent, or Firm*—Rosenberg, Klein & Lee

(57) ABSTRACT

A walk-substituting cart has a transverse rod secured to a chassis thereof, first and second sleeves secured on the transverse rod, first and second rotating shafts passed through the sleeves for connection to a handlebar device, a connecting rod, a front wheel on each side, and two transmission rods; the first sleeve is nearer to one side of the chassis while the second sleeve is right behind the middle of the front of the cart; the connecting rod is pivoted to the rotating shafts at two ends for passing on turning motion; each front wheel has a direction changing plate joined thereto, and the transmission rods are pivoted to respective direction changing plates, and pivoted to the second rotating shaft; therefore, the handlebar device can be located either right behind the middle of the front of the cart or nearer to a lateral side of the cart.

5 Claims, 6 Drawing Sheets

STEERING STRUCTURE OF A WALK-SUBSTITUTING CART

BACKGROUND OF THE INVENTION

1. Field of the invention

The present invention relates to a steering structure of a walk-substituting cart, more particularly one, which allows the handlebar device to be located either right behind the middle of the front of the cart or nearer to a lateral side of the cart for suiting different situations.

2. Brief Description of the Prior Art

Walk-substituting carts consist of an electric motor, a storage battery, which supplies direct current to the electric motor. There is only a small amount of heat energy produced by friction when electric energy is transformed into kinetic energy. Furthermore, when such walk-substituting carts are running, there is virtually no noise because electric motors run on the principle of magnetic attraction and repulsion. Therefore, it won't produce pollution or noise to use electric walk-substituting carts. And, walk-substituting carts are usually used by the elderly and for transporting people on golf courses.

A conventional steering structure of a walk-substituting cart consists of a first transverse rod, two front wheel support members, a rotating shaft, a transmission element, a second transverse rod, and a handlebar device. The first transverse rod is secured on a chassis of the walk-substituting cart, and the rotating shaft is passed through and fitted to the first transverse rod. The front wheel support members are fitted to respective ones of two ends of the first transverse rod. The handlebar device is coupled to an upper end of the rotating shaft. The transmission element is joined to a lower end of the rotating shaft at one end, and joined to the second transverse rod at the other end. The second transverse rod is connected to the front wheel support members at two ends thereof. Therefore, turning motion of the handlebar device will be passed on to the front wheels of the cart through the rotating shaft, the transmission element, the second transverse rod, and the front wheel support members.

However, when such a steering structure is used on a large-sized walk-substituting cart accommodating more than single person (two or four people), problems will arise because the handlebar device is fixed in position, i.e. right behind the middle of the front of the cart; the handlebar device is preferably located right behind the middle of the front of the cart if there is single person (the driver) on the cart. And, the handlebar device is preferably located nearer to one lateral side of the cart, instead of right behind the middle of the front, for allowing the driver to control the cart without interference if there is another person seated on next to the driver.

SUMMARY OF THE INVENTION

It is a main object of the invention to provide an improvement on a steering structure of a walk-substituting cart to overcome the above-mentioned problems.

The steering structure of the present invention consists of a transverse rod secured to a chassis thereof, first and second sleeves secured on the transverse rod, first and second rotating shafts, a connecting rod, a front wheel on each side, two transmission rods, and a handlebar device; the first sleeve is nearer to one side of the chassis while the second sleeve is right behind the middle of the front of the cart. The first and the second rotating shafts are passed through the first and the second sleeves respectively for connection with the handlebar device. The connecting rod is pivoted to the rotating shafts at two ends for passing on turning motion of the rotating shafts. Each of the front wheels has a direction changing plate part joined thereto, and the transmission rods are pivoted to respective direction changing plate parts, and pivoted to the second rotating shaft. Therefore, the handlebar device can be located either right behind the middle of the front of the cart or nearer to a lateral side of the cart for suiting different situations.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
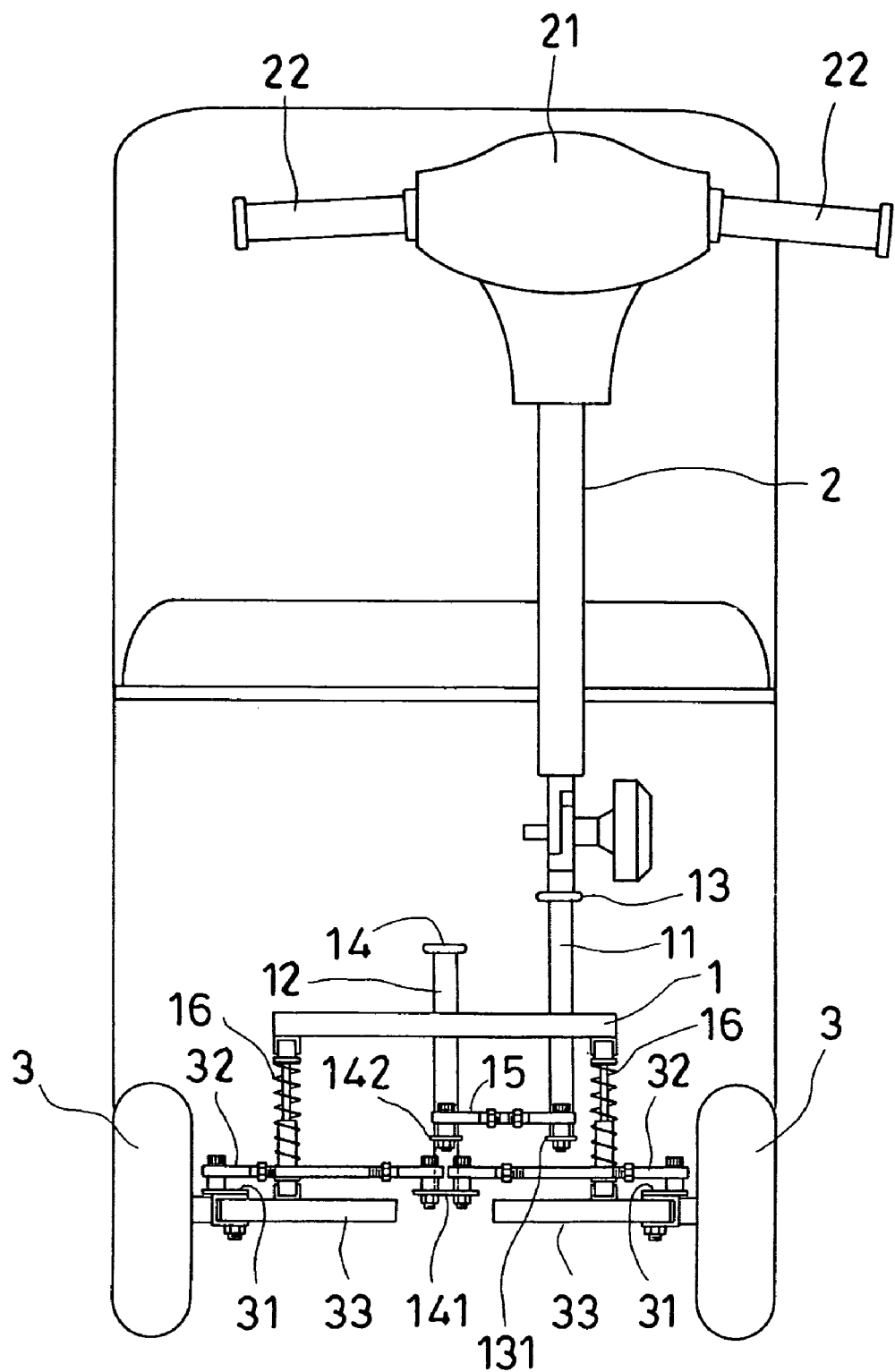
FIG. 1 is a front view of the present invention, taken when the handlebar device is fitted apart from the middle.
Figure 2:
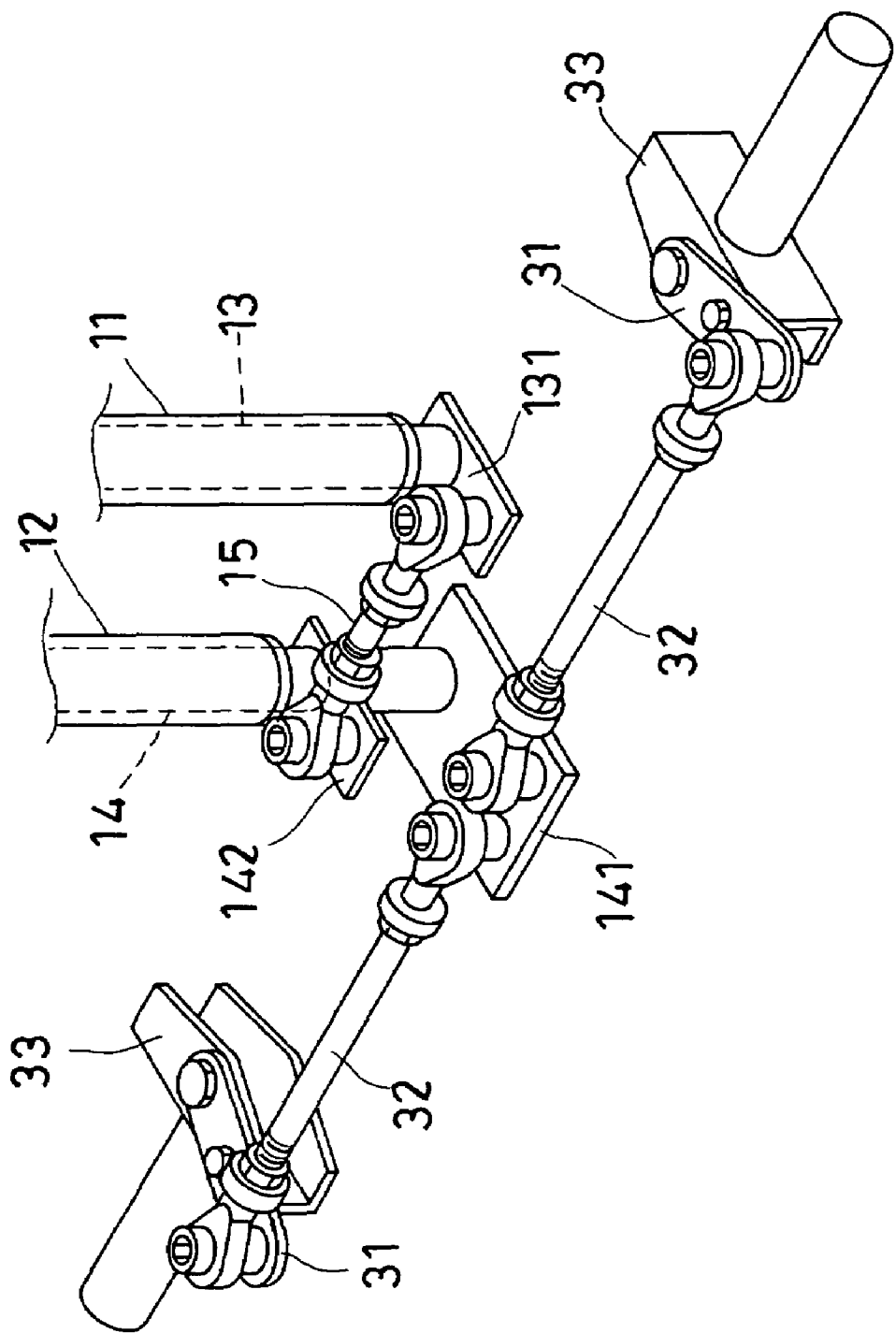
FIG. 2 is a fragmentary exploded perspective view of the present invention.
Figure 3:
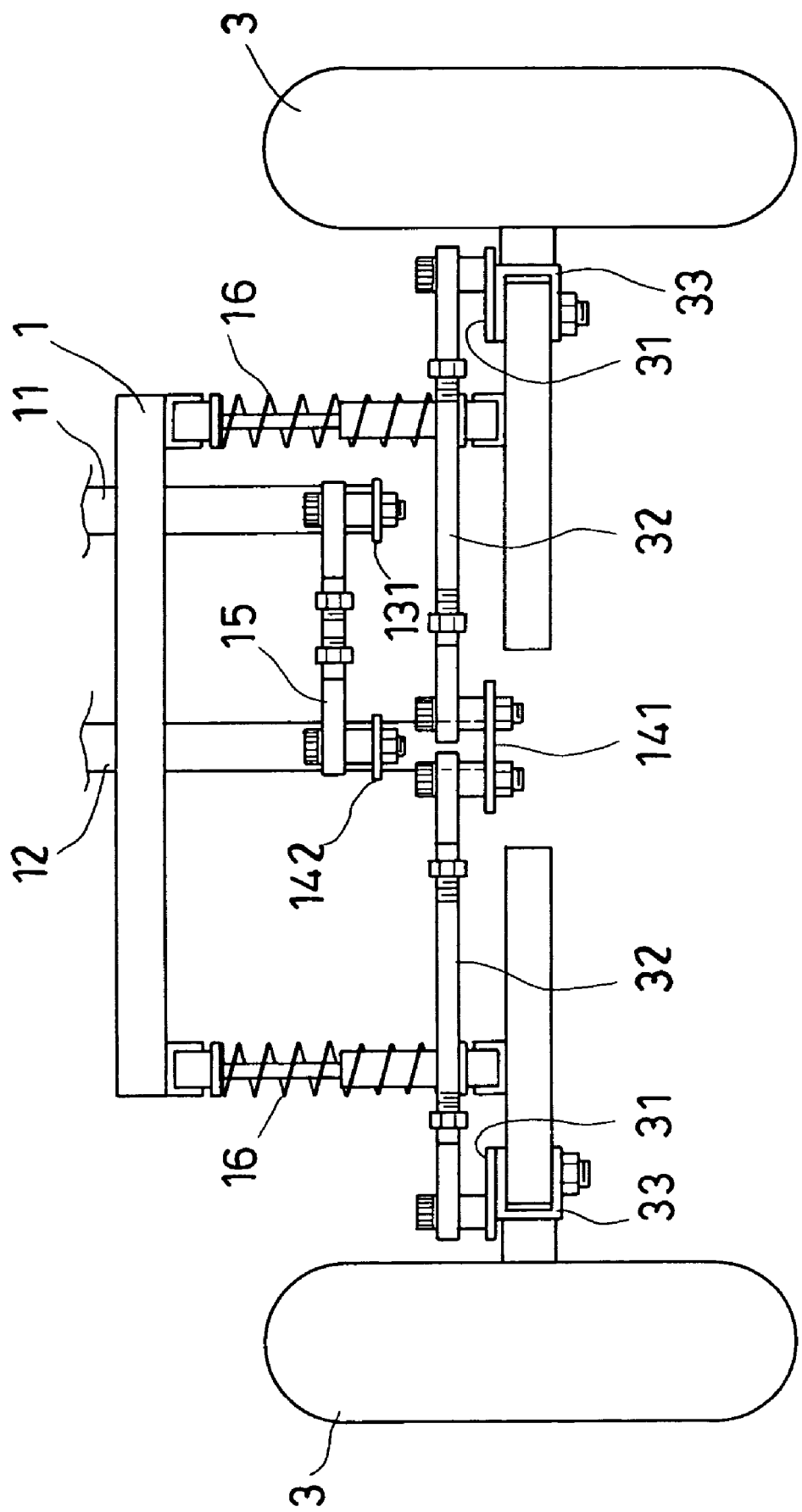
FIG. 3 is a partial front view of the present invention.
Figure 4:
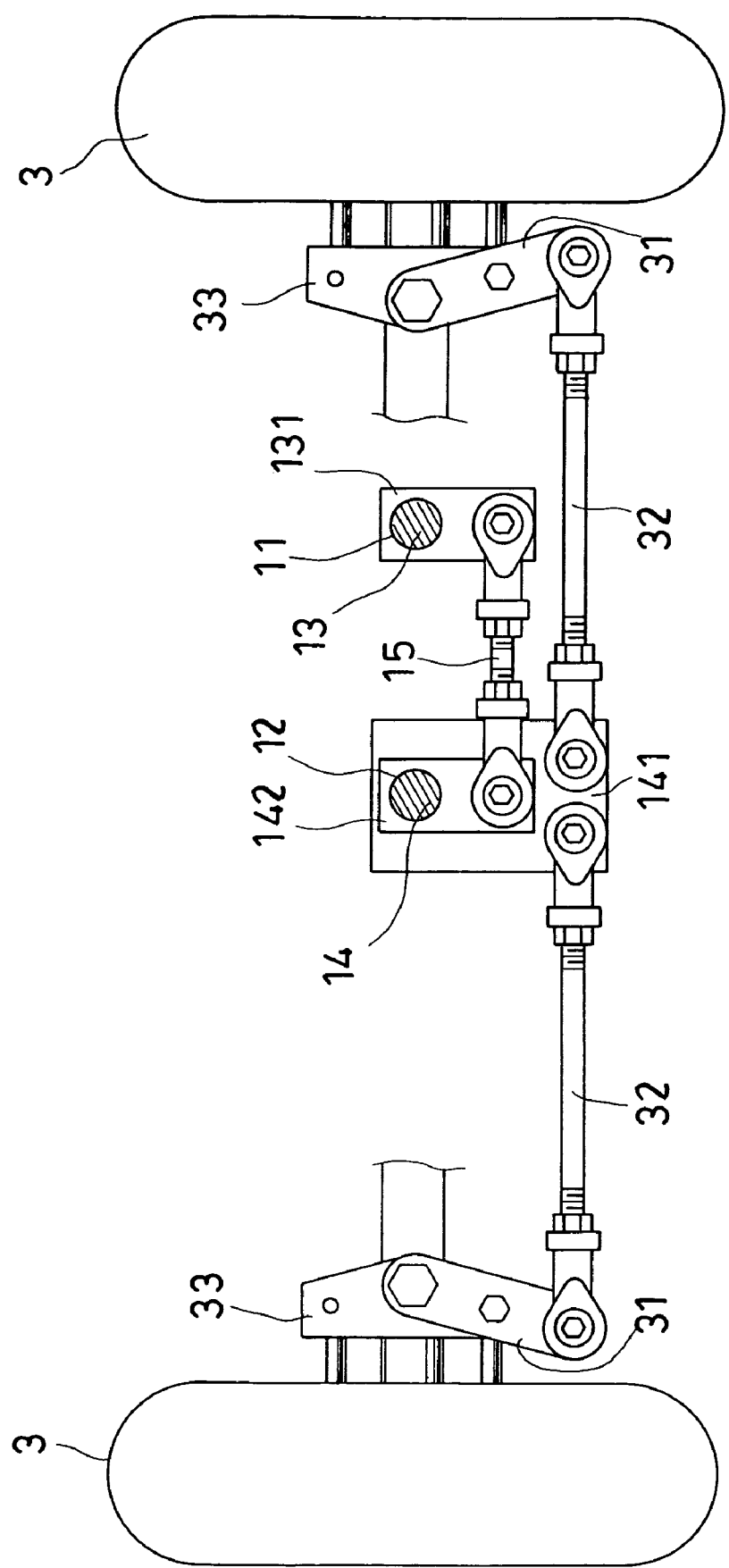
FIG. 4 is a partial top view of the present invention.
Figure 5:
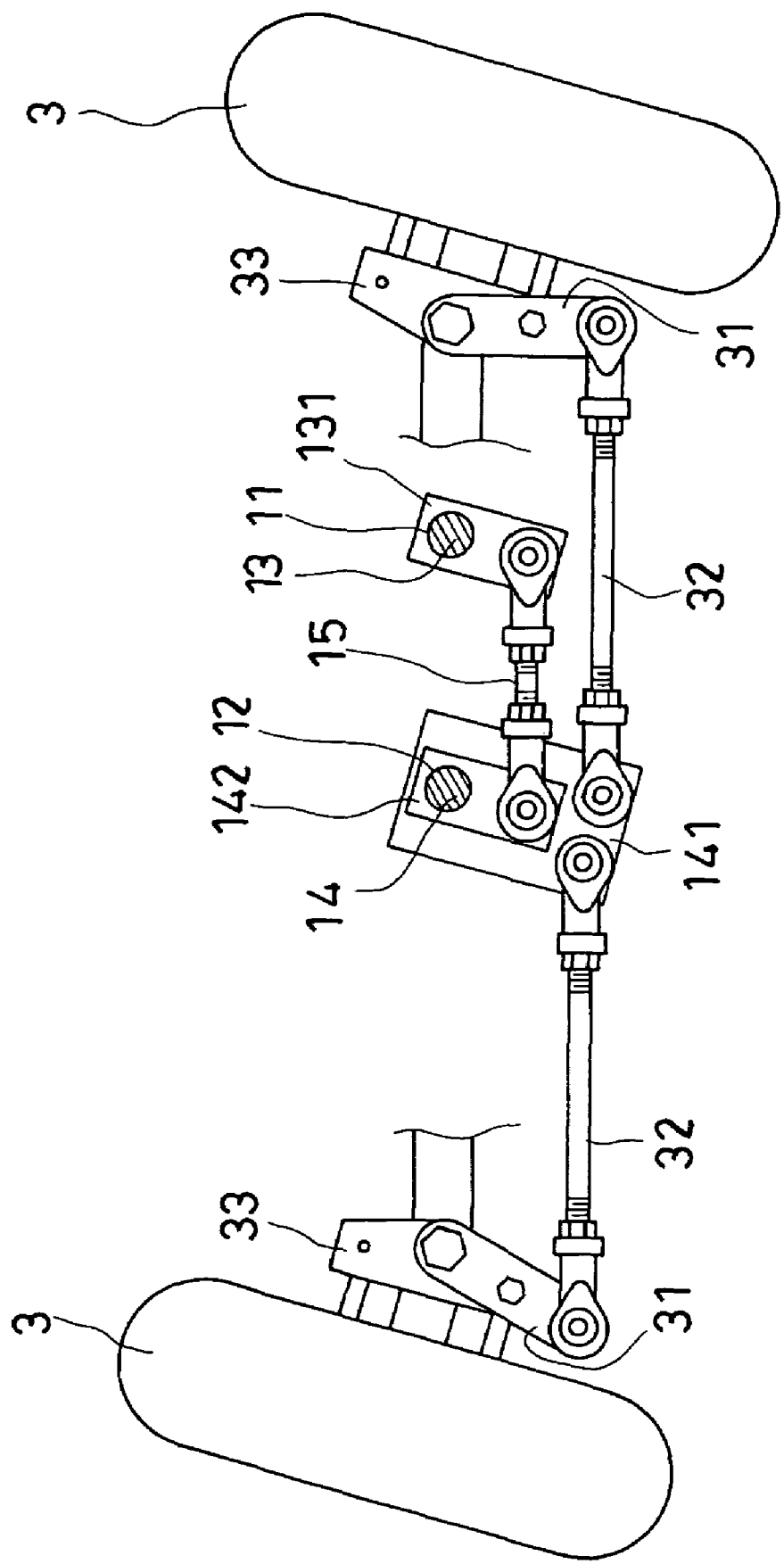
FIG. 5 is a partial top view of the present invention, taken when the handlebar device is being turned.
Figure 6:
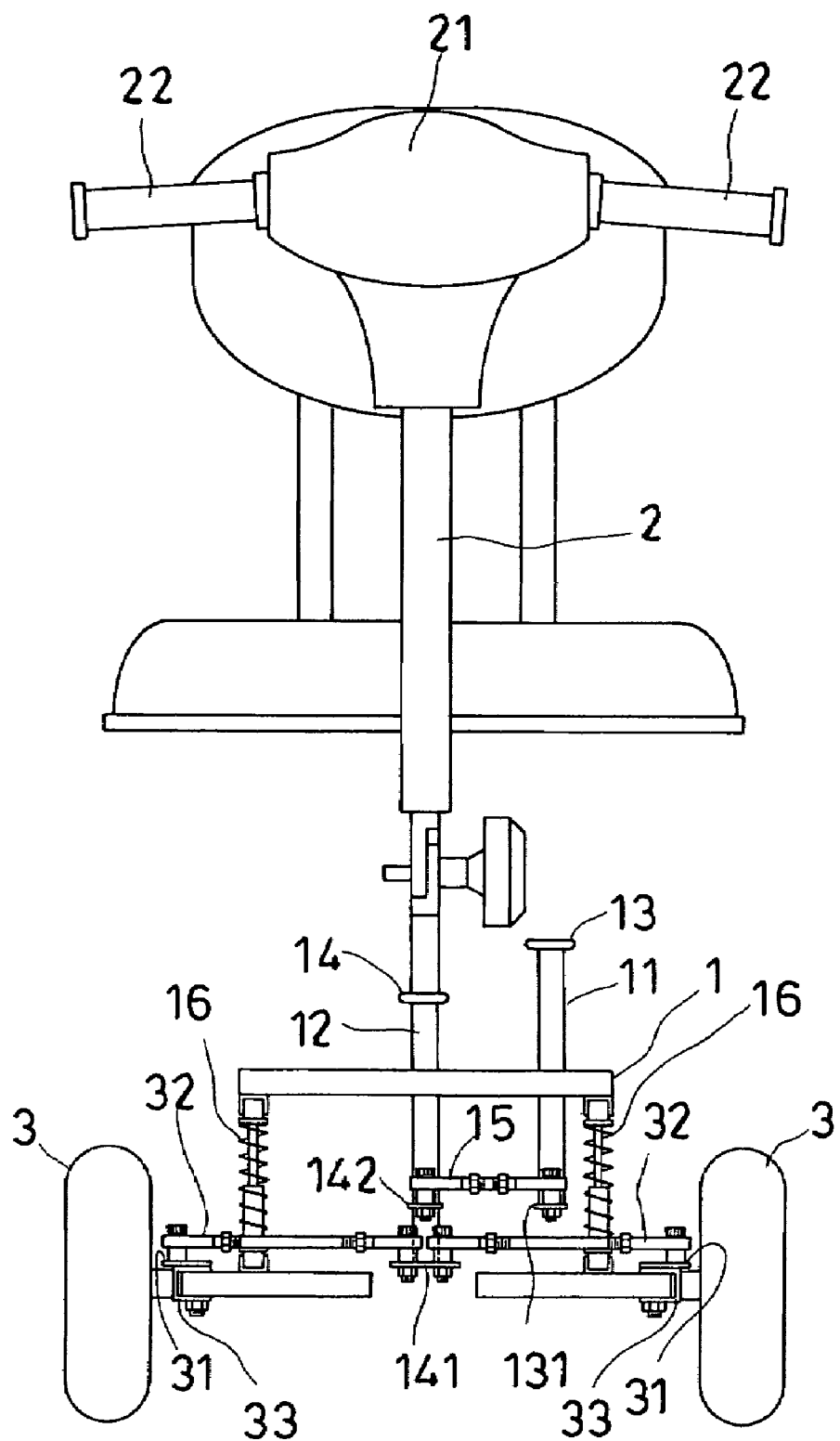
FIG. 6 is a front view of the present invention, taken when the handlebar device is fitted right behind the middle of the front of the cart.

Referring to FIGS. 1 to 6, a preferred embodiment of a steering structure of a walk-substituting cart consists of:

a transverse rod 1, the transverse rod 1 is secured to a chassis of a walk-substituting cart;

a first fixed sleeve 11, the first fixed sleeve 11 is secured to the transverse rod 1, apart from a middle of the transverse rod 1 and in a substantially upright position;

a second fixed sleeve 12, the second fixed sleeve 12 is secured to the middle of the transverse rod 1 in a substantially upright position so that the second fixed sleeve 12 is right behind a middle of a front of the walk-substituting cart;

a first rotating shaft 13 passed through the first fixed sleeve 11; the first rotating shaft 13 has a horizontally extending plate-shaped part 131 on a lower end thereof;

a second rotating shaft 14 passed through the second fixed sleeve 12; the second rotating shaft 14 has a horizontally extending lower plate-shaped part 141 on a lower end, and a horizontally extending upper plate-shaped part 142 above the lower plate-shaped part 141;

a connecting rod 15, the connecting rod 15 is pivoted to the plate-shaped part 131 of the first rotating shaft 13 and the upper plate-shaped part 142 of the second rotating shaft 14 at two ends;

a handlebar device 2, the handlebar device 2 has a fork-shaped portion 21 at an upper end, and handlebars 22 connected to two ends of the fork-shaped portion 21;

two front wheels 3 arranged on two lateral sides of the walk-substituting cart, each of the front wheels 3 has a fixed plate part 33 secured thereto, and a direction changing plate part 31, which is pivoted to a front end of the fixed plate part 33 at a middle portion thereof, and pivoted to a middle portion of the fixed plate part 33 at a rear end thereof;

a transmission rod 32 pivoted to each of the direction changing plate parts 31 at one end, the transmission rods 32 are pivoted to the lower plate-shaped part 141 of the second rotating shaft 14 at the other end; and a shock absorber 16 positioned between the transverse rod 1 and each of the fixed plate parts 33 of the front wheels 3.

Therefore, after the handlebar device 2 is coupled to either one of the first and the second rotating shafts 13, 14, the driver is allowed to steer the walk-substituting cart by means of turning the handlebar device 2; if the handlebar device 2 is coupled to the first rotating shaft 13, turning motion of the handlebar device 2 will be passed on to the front wheels 3 through the first rotating shaft 13, the connecting rod 15, the second rotating shaft 14, the transmission rods 32, the direction changing plate parts 31, and the fixed plate parts 33, thus causing the front wheels 3 to change direction; if the handlebar device 2 is coupled to the second rotating shaft 14, turning motion of the handlebar device 2 will be passed on to the front wheels 3 through the second rotating shaft 14, the transmission rods 32, the direction changing plate parts 31, and the fixed plate parts 33, thus causing the front wheels 3 to change direction.

If there are two or more than two persons on the walk-substituting cart, the handlebar device 2 is preferably coupled to the first rotating shaft 13, which is apart from the middle of the transverse rod 1, for the driver to be seated on one side of the walk-substituting cart, apart from the middle. And, if there is only a person (driver) on the cart, the handlebar device 2 is preferably coupled to the second rotating shaft 14, which is on the middle of the transverse rod 1, for the driver to be seated right behind the middle of the front of the walk-substituting cart.

From the above description, it can be seen that the steering structure of the present invention is relatively convenient to use when compared with the conventional one.

What is claimed is:

1. An improvement on a steering structure of a walk-substituting cart, comprising
   a transverse rod secured to a chassis of a walk-substituting cart;
   a first fixed sleeve secured to the transverse rod in such a position as to be apart from a middle of the transverse rod;
   a second fixed sleeve secured to a middle of the transverse rod;
   a first rotating shaft passed through the first fixed sleeve;
   a second rotating shaft passed through the second fixed sleeve;
   a connecting rod, the connecting rod being pivoted to the first rotating shaft and the second rotating shaft at two ends for passing on turning motion from one of the first and the second rotating shafts to other one;
   a front wheel on each of two lateral sides of the chassis, each of the front wheels having a direction changing plate part joined thereto; and
   a transmission rod pivoted to each of the direction changing plate parts of the front wheels at one end; the transmission rods being pivoted to the second rotating shaft at other end.

2. The improvement on a steering structure of a walk-substituting cart as recited in claim 1, wherein each of the front wheels has a fixed plate part secured thereto, and a shock absorber is positioned between the transverse rod and each of the fixed plate part.

3. The improvement on a steering structure of a walk-substituting cart as recited in claim 1, wherein the first rotating shaft has a horizontally extending plate-shaped part on a lower end thereof, and the second rotating shaft has a horizontally extending lower plate-shaped part on a lower end, and a horizontally extending upper plate-shaped part above the lower plate-shaped part.

4. The improvement on a steering structure of a walk-substituting cart as recited in claim 1, wherein each of the front wheels has a fixed plate part secured thereto, and is fitted to a respective one of the lateral sides of the chassis by means of the fixed plate part.

5. The improvement on a steering structure of a walk-substituting cart as recited in claim 4, wherein each of the direction changing plate parts is pivoted to a front end of a corresponding one of the fixed plate parts at a middle portion thereof, and pivoted to a middle portion of the corresponding fixed plate part at a rear end thereof.

* * * * *